A. HOILAND.
FLYING MACHINE.
APPLICATION FILED MAY 20, 1918.

1,308,784.

Patented July 8, 1919.
2 SHEETS—SHEET 1.

INVENTOR:
Albert Hoiland
BY his ATTORNEY:
A.M. Carlsen

A. HOILAND.
FLYING MACHINE.
APPLICATION FILED MAY 20, 1918.

1,308,784.

Patented July 8, 1919.
2 SHEETS—SHEET 2.

INVENTOR:
Albert Hoiland,
BY his ATTORNEY:
A. M. Carlsen.

UNITED STATES PATENT OFFICE.

ALBERT HOILAND, OF FARGO, NORTH DAKOTA, ASSIGNOR OF ONE-TENTH TO ANDREW M. CARLSEN, OF ST. PAUL, MINNESOTA.

FLYING-MACHINE.

1,308,784.　　　　　Specification of Letters Patent.　　Patented July 8, 1919.

Application filed May 20, 1918.  Serial No. 235,638.

*To all whom it may concern:*

Be it known that I, ALBERT HOILAND, citizen of the United States, residing at Fargo, in the county of Cass and State of North Dakota, have invented a new and useful Flying-Machine, of which the following is a specification.

This invention relates to flying machines, and the main object is to provide an efficient flying machine for military service, and to that end the machine is so constructed that it may ascend without moving horizontally, and likewise it may be held in any desired place in the air without moving in any direction, thus enabling the aviator to take exact vertical aim and either shoot shells or drop bombs upon any building, ship or war supply station, fort or base, where he wishes to cause destruction. Other objects and advantages will appear in the following specification, and the novel features of the structure will be particularly pointed out in the appended claims.

In the accompanying drawings—

Figure 1:
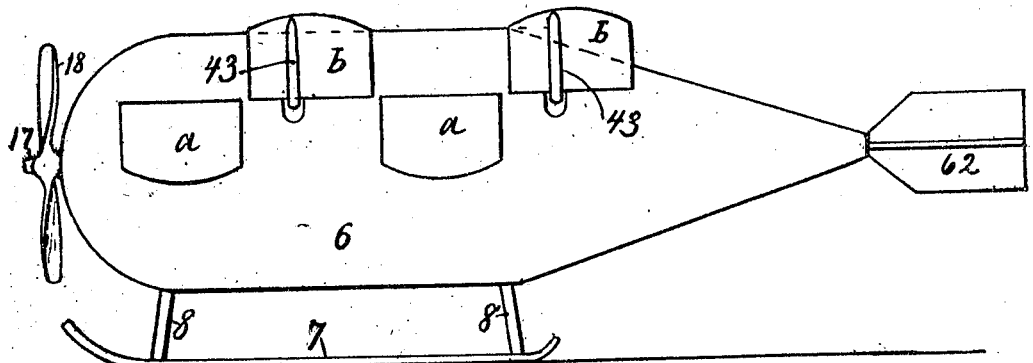
Figure 6:
Figure 6:
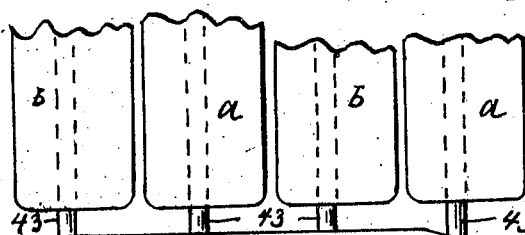
Figure 2:
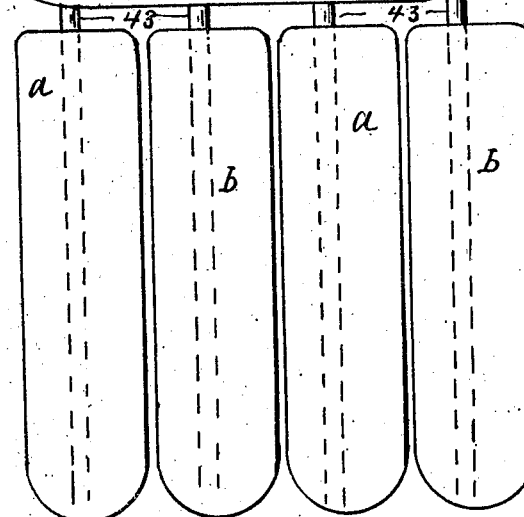
Figure 5:
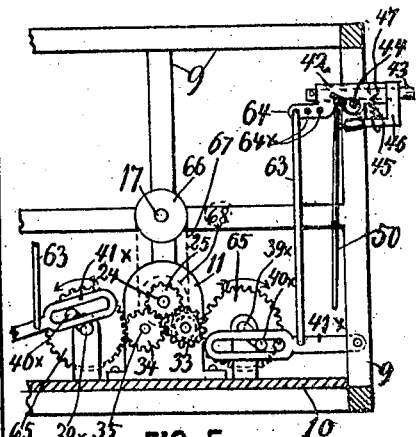
Figure 4:
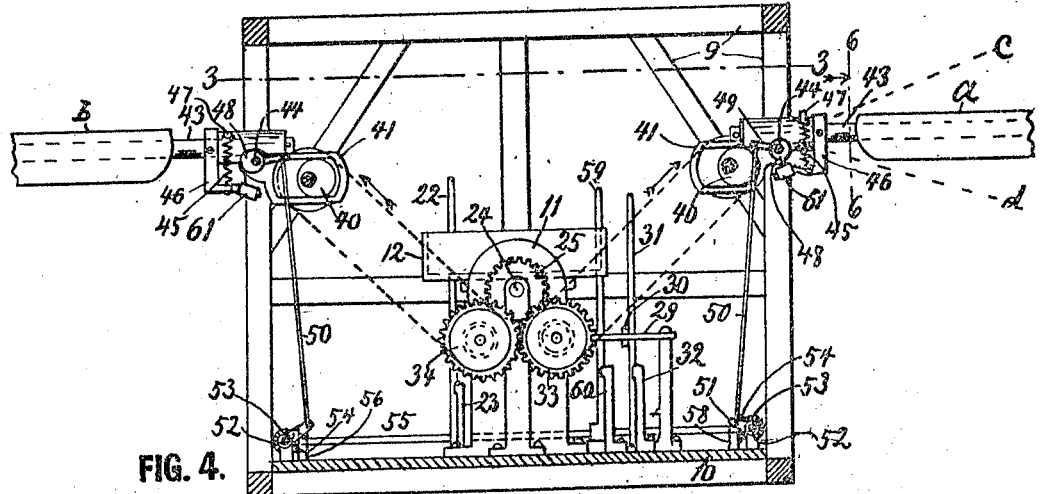
Figure 3:
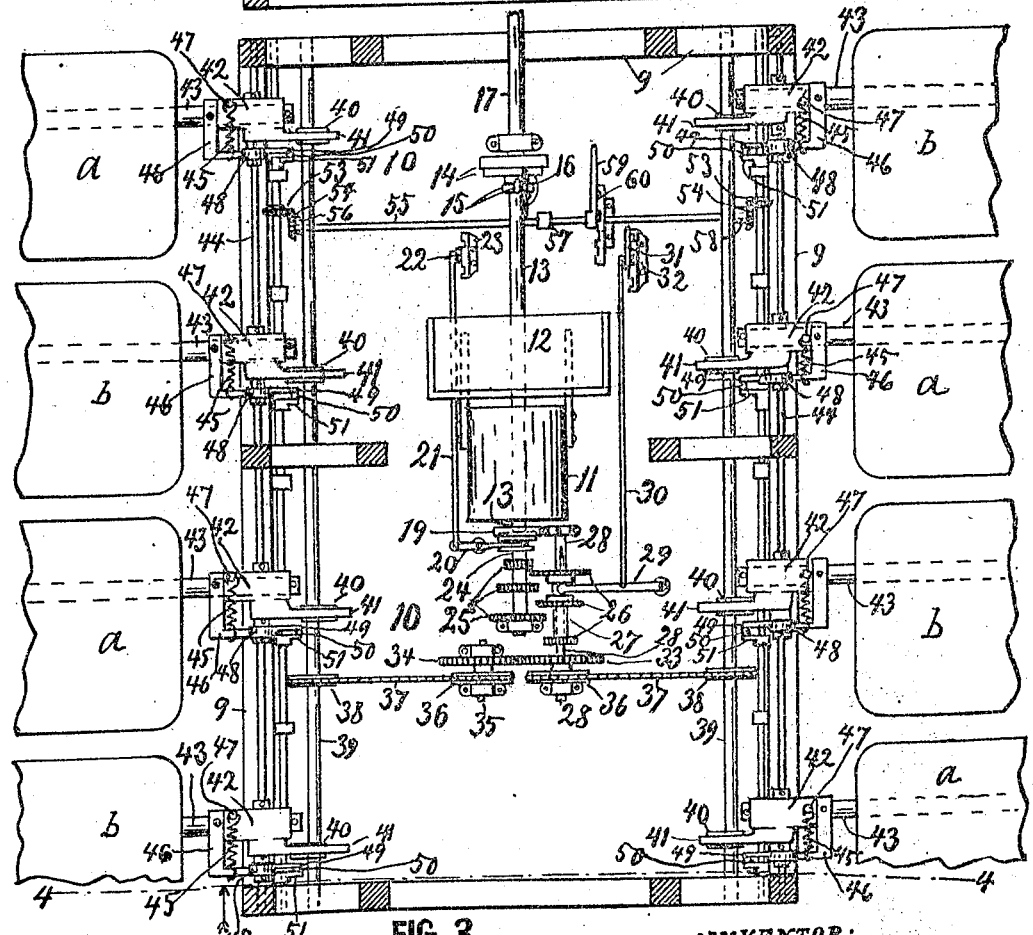

Figure 1 is a side elevation of the improved flying machine, Fig. 2 is a top or plan view of Fig. 1. Fig. 3 is an enlarged plan view of the main frame and mechanism of the machine intersected about as on the line 3—3 in Fig. 4. Fig. 4 is a cross section on the line 4—4 in Fig. 3 with the eccentrics 40 turned toward the right instead of toward the left in Fig. 3. Fig. 5 shows several of the parts of the machine modified, the view is a cross section about as on the line 4—4 in Fig. 3 but on a reduced scale. Fig. 6 is a section on the line 6—6 in Fig. 4.

Referring to the drawing by reference numerals, 6 designates in a general way the body of the flying wheel. It is provided with runners 7 and legs 8, simply to support it high enough above the ground to allow the lateral wings, *a*, and *b*, to operate without striking the ground. The main frame may be of any suitable construction, and may have more or less of its lower portion closed by a floor 10.

Mounted on the floor is a motor 11, near which is mounted a seat 12, for the operator. The motor shaft 13 is provided at its front end with a clutch 14, which when operated by a lever 15, adapted to engage a notched sector 16, will engage and rotate the shaft 17 of a propeller 18 whenever it be desired to use said propeller.

At the rear end of the motor shaft is another coupling, 19, which is controlled by a shifter 20, rod 21, and hand lever 22, the latter arranged to engage in a notched sector 23, and thus hold the clutch either in active or in idle position. When said clutch is in active position, it rotates a short shaft 24 having several gears 25, all of different sizes and arranged to be engaged alternately one at a time by one of several gears 26, which are fixed on a sleeve 27, the latter is slidably keyed on the shaft 28 and is slid on same by a shifter 29, rod 30, and a hand lever 31, the latter is arranged to be held in either notch of a notched bracket 32. The gear arrangement just described serves to change the speed of the shaft 28 without changing the speed of the motor.

Upon the rear end of the shaft 28 is fixed a gear 33, that meshes with a gear 34, rotating either on or with a short shaft 35. Fixed to rotate with each gear 33 and 34 is a sprocket 36, which by a link-belt 37 drives a sprocket 38, the latter sprockets are fixed one on each of two parallel shafts 39, which in Figs. 3 and 4, are located in the upper part of each side of the frame, and on each of them is fixed an eccentric 40 for each wing, *a* and *b*, at the adjacent side of the machine. Preferably every other eccentric is fixed in opposite radial direction of the shaft to the next eccentric thereon; and each eccentric on either shaft points in the same radial direction as the eccentric directly across therefrom on the shaft in the other side of the machine.

Each eccentric operates in a yoke 41, which is fixed on a sleeve 42, the latter serving as journal bearing for the arm 43 of each wing and is trunnioned on a shaft or bar 44, so as to swing the wing up and down when tilted by the eccentric, the upward movement of the wing being faster than the downward movement, because the eccentric is nearer to the trunnion joint while it causes the upward stroke of the wing.

About two-thirds of the width of each wing being rearward of the wing bar or stem 43, the retarding effect of the air will cause each wing to turn its front edge practically upward during the upward stroke of the wing, and at the start of the downward stroke the air will restore the wing to normal about level position. The latter turning movement of the wing is hastened by a spring 45, which has one end attached to a rocker arm 46 fixed on the journal 43 of the wing, and the other end attached to a projection 47 on the journal box 42.

To control and regulate this partial rotation of the wing journal under various conditions, I mount loosely upon each shaft 44, a series of cams or eccentrics 48, each one provided with a rocker arm 49, which by a rod 50 is connected with a rocker arm 51 fixed on a rock-shaft 52, mounted near the floor of the machine. Each of said rock-shafts is provided with a miter-gear 53, meshing with a miter-gear 54, fixed on a transverse shaft 55. The latter shaft is mounted in bearings 56, 57, 58 and provided with a hand lever 59, shiftable into different notches in a sector 60, by which means the eccentrics 48 are held in different rotated positions. And in such positions different radii of each eccentric will stop the upward swinging of the rocker arm 46. It should here be noted that each arm 46 has an angular end portion meeting the periphery of the eccentric 48 and is provided with a cushion 61 (see Fig. 4) to contact with the eccentric with the least possible noise. It will also be noted, that said cushions are each arranged at an incline; this is to compensate for the varied, raised or lowered position of the different wings at the moment they are to be tilted. Thus by considering the wing $a$, in Fig. 4 in the light of Fig. 6, it will be understood that when the propeller is in use all the wings, $a$ and $b$, are set in about the position $a^1$, in Fig. 6, and are held still, to serve as air planes. For flying upward only, the wings are set as $a^2$, in Fig. 6, and operated while the propeller is idle; and if the engine gets out of order so it becomes necessary to volplane down, then the wings are all simultaneously tilted to about the position $a^3$, in Fig. 6. The latter tilting may also be used together with operation of the propeller when an extra high forward speed may be desired, as in chasing an enemy or in escaping from him.

Said three tilted positions and even other extra positions of the wings are secured by placing of the lever 59 in the required notch of the sector 60, as that will hold all the cams or eccentrics 40 in like relation to the cushions 61, provided all the wings could occupy say the horizontal position $a$, in Fig. 4, but as already indicated every other wing, say all wings $a$ in Figs. 2 and 3 are raised simultaneously, say up to the line $c$ in Fig. 4, and at the same time all wings $b$, are down to the line $d$, in said figure, and while in said positions, the cushions 61 of the raised wings would strike almost the largest radius of the eccentrics and the cushions of the lowered wings would strike too close to the smallest radius of each eccentric, it is to remedy this that each cushion is inclined or else made smaller toward the end of the arm holding it, so when the wing is raised the lower end of the cushion will hit the larger part of the eccentric, and when the wing is down to $d$, the larger or higher end of the cushion will contact with the small part of the eccentric, and when the wing is anywhere between its upper and lower positions $c$, and $d$, in Fig. 4, the cushion will stop the tilting of the wing at the proper time by contacting with the proper part of the eccentric between the highest and lowest point thereof.

In further describing the operation, it will, of course, be understood that by means of the clutches 14 and 19, the propeller or the wings or both propeller and wings may be started and run by the motor, and that the speed of the wings may be regulated by the gears 25, 26 and lever 31. The tail or rudder 62 may be of any suitable form and operated by any suitable means. And the wings $a$ and $b$, may likewise be constructed of any suitable light material, and as to their numbers and arrangement, I have shown eight wings, but it is obvious that four, six or more than eight may be employed, and while I have shown the wings as operated in pairs located one wing diagonally from the other at the opposite side of the machine, it is evident that the wings may also be operated in pairs of two wings directly opposite one from the other, this depends simply on how the eccentrics 40 are arranged on their shafts. The main idea is to use many wings so as to be able to fly even if some of them should get damaged. Also to distribute the weight of the machine in the best possible way upon the wing area; and, above all, to have some wings support the machine while the other wings are hastened upward for a new hold on the air.

In the modification shown in Fig. 5, it will be seen that if so desired many of the heavy machine parts may be located nearer to the floor than in Fig. 4. Also that instead of the eccentrics 40, cranks $40^x$ may be employed, and the yokes 41 are removed from the journals 42 and placed as $42^x$ and connected by a rod 63 to an arm 64 on the journal box; said arm is provided with several apertures $64^x$, to which the rod 63 may be moved and thereby increase or decrease the stroke of the wing. In this modified form the rod 50 and all its connections are the same as those shown in Fig. 4.

Of further improvements shown in Fig. 5, the chains 37 are dispensed with and the shafts $39^x$ provided with gears 65 driven by the gears 33 and 34. The engine or motor is also made lower or brought closer to the floor, and as this brings the motor shaft lower than the propeller shaft, the latter is provided with a sprocket 66, driven by a chain 67 from a sprocket 68 fixed on the motor shaft, or on a shaft clutch connected with the motor shaft. Or, if it be desired to dispense with all chains and sprockets from the machine, the wheels 66 and 68 may be made gear wheels of suitable sizes to mesh together.

What I claim is:

1. In a flying machine, a suitable frame, a motor, a series of pivotally mounted wings extending from each side of the frame, operative connection between the motor and the wings, by which alternatively some wings at each side of the frame are swung upward while others are swung downward; said wings being mounted to tilt to different forwardly and rearwardly inclined positions; springs arranged to aid the air in tilting the wings upward with their rear edges into active position, means for automatically limiting said tilting action of the springs, and means to be operated by the aviator whereby the automatic limiting means may be varied to permit all the wings to tilt simultaneously to any desired position.

2. The structure specified in claim 1, said means for limiting the action of the springs being automatically adjustable so as to act on all the wings alike regardless of the longitudinal inclination of the wings resulting from their swinging movement in the act of flying.

3. The structure specified in claim 2, said frame having at each side a longitudinal fixed shaft serving as pivots for the wings said automatic limiting means comprising a series of eccentrics loosely mounted on each of said shafts, and means for turning all of said eccentrics simultaneously to any desired position, a series of journal boxes trunnioned across each of said shafts and having each a rocker arm forming a part of the operative connection with the motor; each wing having its inner end provided with a stem journaled in one of said bearings and provided with a rocker arm arranged to stop against the face of the adjacent eccentric when the wing is feathered to the desired active position, said springs for tilting the wings being each connected at one end to the rocker arm on the stem and at the other end to the journal bearing.

4. The structure specified in claim 3, said rocker arms on the stems being each provided with cushioning means at the point or part stopping against the eccentric.

In testimony whereof I affix my signature.

ALBERT HOILAND.